United States Patent [19]

Ghosh et al.

[11] Patent Number: 5,336,282
[45] Date of Patent: Aug. 9, 1994

[54] ZIRCONIA CERAMICS AND A PROCESS OF PRODUCING THE SAME

[75] Inventors: Syamal K. Ghosh; Dilip K. Chatterjee; Dennis R. Koziol, all of Rochester, N.Y.

[73] Assignee: Eastman Kodak Company, Rochester, N.Y.

[21] Appl. No.: 999,171

[22] Filed: Dec. 21, 1992

Related U.S. Application Data

[63] Continuation of Ser. No. 816,646, Dec. 31, 1991, abandoned.

[51] Int. Cl.$^5$ .................. B24D 3/16; C04B 35/48
[52] U.S. Cl. ..................... 51/309; 501/103; 501/104
[58] Field of Search .............. 501/103, 104; 51/309

[56] References Cited

U.S. PATENT DOCUMENTS

| | | | |
|---|---|---|---|
| 690,911 | 9/1987 | Nakada | 501/105 |
| 3,900,542 | 8/1975 | Palmour, III et al. | 264/40 |
| 4,360,598 | 11/1982 | Otagiri et al. | 501/103 |
| 4,430,279 | 2/1984 | Hagio et al. | 264/65 |
| 4,490,319 | 12/1984 | Lee et al. | 264/65 |
| 4,587,225 | 5/1986 | Tsukuma et al. | 501/104 |
| 4,610,967 | 9/1986 | Imanishi et al. | 501/103 |
| 4,626,518 | 12/1986 | Watanabe et al. | 501/104 |
| 4,666,467 | 5/1987 | Matsumoto et al. | 501/104 X |
| 4,866,014 | 9/1989 | Cassidy et al. | 501/103 |
| 4,886,768 | 12/1989 | Tien | 501/104 |

FOREIGN PATENT DOCUMENTS

| | | | |
|---|---|---|---|
| 0151335 | 8/1985 | European Pat. Off. | 501/103 |
| 58-9784 | 2/1983 | Japan. | |

OTHER PUBLICATIONS

R. Stevens, "Zirconia and Zirconia Ceramics", Jul. 1986.

*Primary Examiner*—Karl Group
*Attorney, Agent, or Firm*—Clyde E. Bailey

[57] ABSTRACT

A zirconia ceramic having a tetragonal phase crystal grain structure and a process for producing same. The ceramic comprises zirconium oxide and a dopant that is an oxide of a rare earth element, calcium, or magnesium, or mixtures thereof, and the ceramic has a molar ratio of dopant to zirconium oxide in the range of from above about 3:97 to about 5:95 when the ceramic comprises less than about 0.5 mole percent of the oxide of magnesium, the ceramic has a molar ratio of dopant to zirconium oxide in the range of from about 0.5:99.5 to about 1.0:99.0 when the ceramic comprises from about 0.5 mole percent to about 1.0 mole percent of the oxide of magnesium, and the ceramic does not comprise more than about 1.0 mole percent of the oxide of magnesium.

6 Claims, 7 Drawing Sheets

ZIRCONIA CERAMICS AND A PROCESS OF PRODUCING THE SAME

This is a Continuation of application Ser. No. 816,646, filed Dec. 31, 1992 now abandoned.

FIELD OF THE INVENTION

The present invention relates to doped zirconia ceramics that exhibit good strength and good resistance to wear, and a process of producing the same. In particular, the invention relates to net shape ceramic tools that can be used without carrying out a post-sintering machining operation.

BACKGROUND OF THE INVENTION

Doped zirconia ceramics are known and can have various configurations of crystal structure. For example, zirconia ceramics can have a cubic phase crystal grain structure. A disadvantage of ceramics having the cubic phase is that they are brittle and therefore easily break from impact or thermal shock. Another form of zirconia ceramic has both the cubic phase and a monoclinic phase, and exhibits improved strength and thermal shock resistance compared to cubic phase ceramics. Both such types of zirconia ceramics, however, tend to rapidly develop cracks which can deteriorate material strength and integrity, thus limiting their usefulness for applications such as cutting tools. It is also necessary to machine both types of ceramics after sintering to obtain a tool having a desired net shape that can be employed for its intended use, adding to the fabrication cost.

Ceramics having a tetragonal phase crystal structure have also been described, generally with the cubic and/or monoclinic phases present in varying proportions. Such ceramics can have improved strength and improved resistance against deterioration in strength compared to the above-described ceramics that do not have a tetragonal phase. These ceramics, however, can also require a post-sintering machining operation, unlike a zirconia ceramic consisting essentially of the tetragonal phase. U.S. Pat. No. 4,360,598 describes tetragonal phase zirconia ceramics and their improved dimensional stability, and discloses a zirconia ceramic having a tetragonal phase that is substantially cubic and monoclinic phase-free. The ceramic, however, consists essentially of the tetragonal phase at just one discrete value of dopant loading, limiting the usefulness of the ceramic and the process.

It is therefore desirable to provide a zirconia ceramic, and a process for producing same, that consists essentially of the tetragonal crystal phase over a wider range of dopant loading than is presently known, and which ceramic can be formed to a net shape.

SUMMARY OF THE INVENTION

The present invention is directed to overcoming one or more of the problems set forth above. Briefly summarized, according to one aspect of the present invention, there is provided a process for producing a zirconia ceramic having a tetragonal phase crystal grain structure. The zirconia ceramic provided by the invention comprises zirconium oxide and a dopant that is an oxide of a rare earth element, calcium, or magnesium, or mixtures thereof, and the ceramic has a molar ratio of dopant to zirconium oxide in the range of from above about 3:97 to about 5:95 when the ceramic comprises less than about 0.5 mole percent of the oxide of magnesium, the ceramic has a molar ratio of dopant to zirconium oxide in the range of from about 0.5:99.5 to about 1.0:99.0 when the ceramic comprises from about 0.5 mole percent to about 1.0 mole percent of the oxide of magnesium, and the ceramic does not comprise more than about 1.0 mole percent of the oxide of magnesium.

The process of the invention comprises a first step of compacting a powder comprising the zirconium oxide and the dopant in the presence of an organic water-soluble binder. The dopant and zirconia oxide are uniformly distributed in the powder. The powder has an average grain size in the range from about 0.1 $\mu$m to about 0.6 $\mu$m and a moisture content of from about 0.2 to about 1.0 percent by volume of the powder when compacted. The compacting pressure is from about 12,000 psi to about 18,000 psi. In order to form a net shape part, the compacting is carried out for a time sufficient to compact the powder to form a green part having a density in the range of from about 3.2 g/cc to about 3.5 g/cc. A preferred such density is about 3.35 g/cc.

The process also comprises a second step of sintering the green part by sequentially:

(a) heating the green part from room temperature at a heating ramp in the range of from about 0.1° C./min. to about 0.5° C./min. to a temperature $T_1$ in the range of from about 200° C. to about 400° C., with the proviso that when $T_1$ is about 400° C. then the following step (b) is not performed but instead step (c) is performed next;

(b) heating the green part from temperature $T_1$ at a heating ramp in the range of from about 0.05° C./min. to about 0.2° C./min. to a temperature $T_2$ of about 400° C.;

(c) heating the green part from temperature $T_2$ at a heating ramp in the range of from about 0.2° C./min. to about 0.5° C./min. to a temperature $T_3$ in the range of from about 500° C. to about 700° C.;

(d) heating the green part from temperature $T_3$ at a heating ramp in the range of from about 1.0° C./min. to about 2.0° C./min. to a temperature $T_4$ in the range of from about 1400° C. to about 1600° C.;

(e) maintaining temperature $T_4$ on the green part within the range of about 1400° C. to about 1600° C. for about 3 hours when $T_4$ is about 1400° C., for about 1 hour when $T_4$ is about 1600° C., and when $T_4$ has an intermediate value therebetween then maintaining $T_4$ for a time interval between 3 hours and 1 hour, to form a sintered part;

(f) cooling the sintered part from temperature $T_4$ at a cooling ramp in the range of from about 0.5° C./min. to about 3.0° C./min. to a temperature $T_5$ in the range of from about 900° C. to about 700° C.; and (g) cooling the sintered part from temperature $T_5$ at a cooling ramp in the range of from about 1.5° C./min. to about 3.0° C./min. to about room temperature to thereby form the ceramic.

The zirconia ceramic produced by the process of the invention consists essentially of tetragonal phase crystal grain over the specified range of dopant level. The invention overcomes the disadvantages of the prior art by providing a net shape zirconia ceramic, consisting essentially of the tetragonal crystal phase over a wide range of dopant loading, with improved strength, wear, and service lifetime, and is useful in applications such as cutting tools.

DESCRIPTION OF THE PREFERRED EMBODIMENTS

Figure 1:
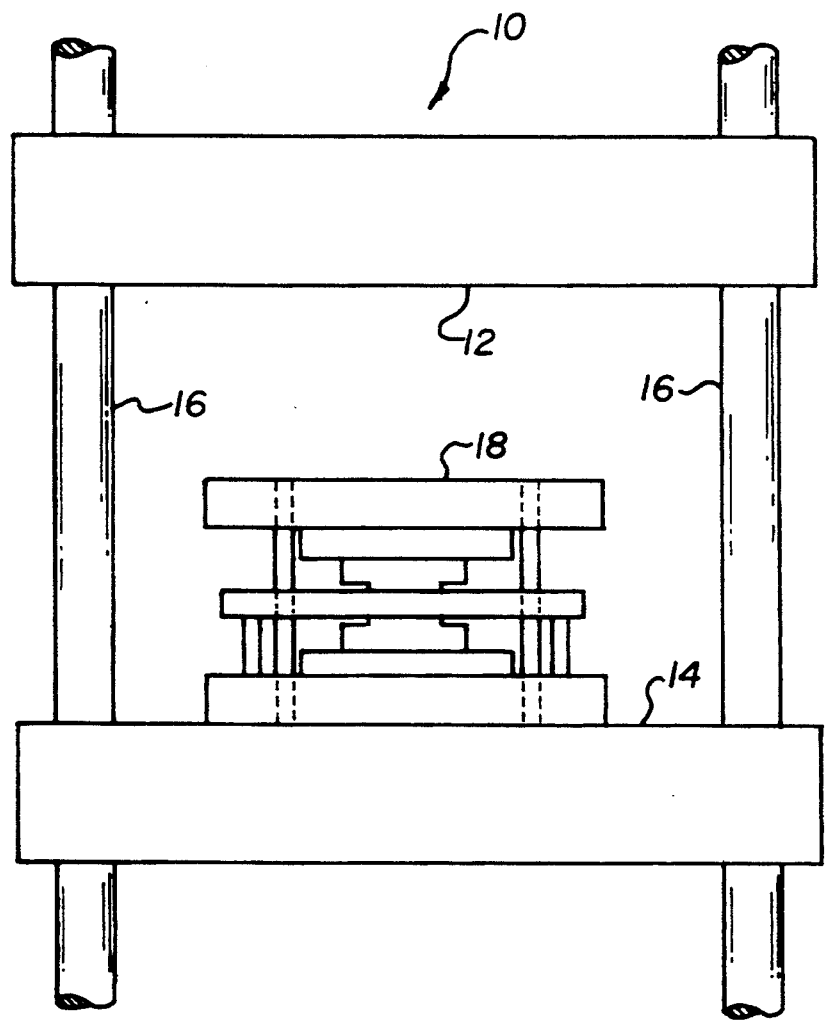
FIG. 1 shows a cross-sectional, fragmentary view of a die press.

The powder employed in the present invention in its precompacted, presintered form comprises zirconium oxide mixed with a dopant as above stated such as $Y_2O_3$. The powder should have certain properties in order to produce a ceramic of the invention consisting essentially of tetragonal phase, cubic and monoclinic phase-free, crystal grain structure. Particle size and distribution of the powder should be uniform, having an agglomerate size in the range of from about 30 μm to about 60 μm with an average of about 50 μm. "Agglomerate" can be defined as an aggregate of individual particles of the ceramic powder, and each particle may comprise multiple grains. "Grain" can be defined as crystals, within the particle, having a spatial orientation that is unaligned with or distinct from adjacent grains. The grain size should be in the range of from about 0.1 μm to about 0.6 μm, with a preferred size of about 0.3 μm. The term "net shape" as used herein, e.g. as in net shape ceramic or net shape part, means that the ceramic is dimensionally true after sintering and therefore should not necessitate further machining prior to use in its intended working environment. In other words, the dimensions both of the green part and the ceramic are predictable in that the amount of shrinkage of the green part during sintering is predictable, producing a ceramic part that conforms to a predetermined shape and dimensions. The amount of shrinkage along any axis of the compacted powder form to that of the net shape ceramic should be less than about 0.001 percent in order to obtain close, predictable dimensional tolerances and produce the net shape ceramic of the invention. Such a part can then be put in its intended use without having to carry out a machining operation. Purity of the material should also be well controlled in the range of from about 99.9 percent to 99.99 percent by weight; that is, impurities should be present in the amount of no more than about 0.1 to about 0.01 percent by weight.

The moisture content of the powder should be maintained between about 0.2 to about 1.0 percent by volume of the powder when compacted. Too dry a powder can result in too porous a ceramic, and too high a moisture level can inhibit good release of the green parts from the mold surface. A preferred moisture content is about 0.5 percent.

The powder is compacted into a green part by means of a die press or the like. The term "green part" as used herein means the powder in its compacted, presintered state. The powder should be compacted by applying uniform compacting forces to the powder in order to produce a green part having a uniform density. A preferred compacting device that achieves uniform compacting forces is a floating mold die press. The green part should have a predetermined density selected by the operator to produce, after sintering, a net shape ceramic article. For example, for specific compositions of powder described herein, a preferred green part density is in the range of from about 3.2 g/cc to about 3.5 g/cc. The compaction pressure determines the density of the green part and consequently that of the ceramic. If the compaction pressure is too low, the ceramic can have a lower than desired density and not attain the desired net shape. If the compaction pressure is too high, the green part can delaminate and result in a ceramic that is defective for the intended use, e.g. for cutting. The compaction pressure for the powders of the invention should be in the range of from about 12,000 psi to about 18,000 psi, and a preferred compaction pressure is about 15,000 psi.

The compaction time can be readily determined by the operator depending on the compaction pressure selected. Compaction time, for example, can be in the range of from about 60 seconds to 10 seconds for compaction pressures in the range of from about 12,000 psi to about 18,000 psi, respectively, and about 30 seconds for a compaction pressure of about 15,000 psi. To produce a net shape ceramic according to the invention, the compacting is carried out for a time sufficient to compact the powder to form a green part having a predetermined density for the selected powder, e.g. from about 3.2 g/cc to about 3.5 g/cc as above described. It is well known that the compaction pressure and time selected by the operator can be dependant on the size of the finished part. Generally, as the part size increases, compaction pressure and/or compaction time increase.

The powder is compacted in the presence of an organic water-soluble binder, such as polyvinyl alcohol, gelatin, or a polyester ionomer. The binder can be added to and mixed with the powder, for example by spray drying or ball milling, prior to placing the powder in the compacting device.

The green part is then sintered to produce the ceramic of the invention. A preferred sintering schedule is to sinter the green part by sequentially:

(a) heating the green part from about room temperature to about 300° C. at a rate of about 0.3° C./min.;

(b) heating the green part from about 300° C. to about 400° C. at a rate of about 0.1° C./min.;

(c) heating the green part from about 400° C. to about 600° C. at a rate of about 0.4° C./min.;

(d) heating the green part from about 600° C. to about 1500° C. at a rate of about 1.5° C./min.;

(e) maintaining the green part at about 1500° C. for about 120 minutes to form a sintered part;

(f) cooling the sintered part from about 1500° C. to about 800° C. at a rate of about 2° C./min.; and (g) cooling the sintered part from about 800° C. to about room temperature at a rate of about 1.6° C./min to thereby form the ceramic.

The heating and cooling rates affect the densification from the green part to the ceramic and must be maintained within the stated ranges of the invention to avoid undesirable dimensional changes and crack development in the ceramic. The process of the invention minimizes the shrinkage that can cause the ceramic to deviate from the desired net shape product, and deviations from the sintering schedules of the invention can produce non-net shape product. Deviations from the temperature range in sintering step (e) or $T_4$ can have a significant adverse effect on density and crystal structure of the ceramic product. If the step (e) temperature or $T_4$ is maintained below 1400° C., the density of the ceramic can be undesirably low and have an undesirable monoclinic crystal phase, and can also produce a non-net shape ceramic; if it is maintained higher than 1600° C., the grain size can be undesirably high and have an undesirable cubic crystal phase, which can also produce a non-net shape ceramic. Minor fluctuations outside the stated range, however, should not have a major adverse effect on the ceramic tetragonal phase composition. The time for maintaining the temperature in step (e) should be about 3 hours at a temperature of about 1400° C., and about 1 hour at a temperature of about 1600° C. The temperature and time are exponentially interrelated, and when $T_4$ has a value between about 1400° C. and about 1600°, the sintering time can be readily determined by the operator without undue experimentation to form the ceramic of the invention.

The sintering atmosphere must have oxygen present and therefore can comprise air, oxygen-enriched air, or the like.

Figure 2:
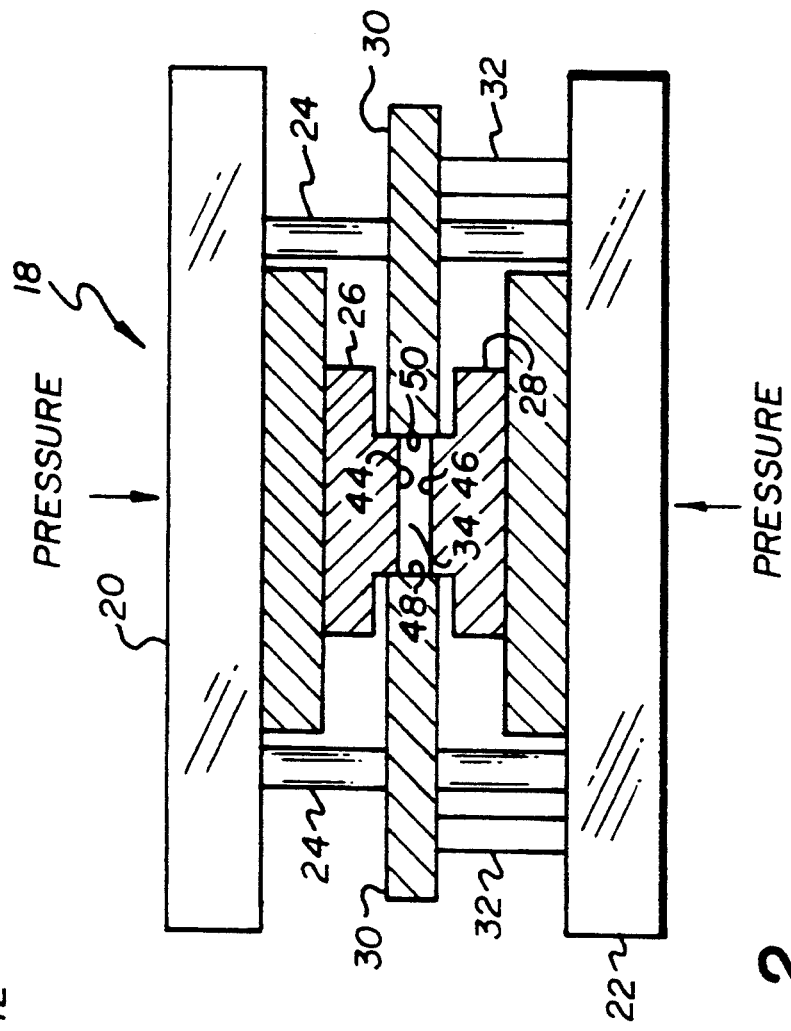
FIG. 2 shows an enlarged cross-sectional view of the mold and die assembly of FIG. 1.

FIG. 1 illustrates a die press 10 useful in forming the green part described herein. Die press 10 comprises fixed platform 12 and movable platform 14 mounted on supports 16. Movable platform 14 is driven by hydraulic means (not illustrated) and supports mold and die assembly 18. FIG. 2 further illustrates assembly 18 as comprising plates 20 and 22 slidably mounted on rods 24. Die sets 26 and 28 are mounted respectively on plates 20 and 22. Center platen 30 is mounted by spacer plates 32 on plate 22, and together with die sets 26 and 28 defines cavity 34 therebetween. A green part is formed as follows. A selected amount of doped zirconia ceramic powder, mixed with a binder as described above, is placed in cavity 34. Platform 14 is then moved in the direction illustrated by the direction arrow in FIG. 1 so that plate 20 contacts platform 12 with a hydraulic pressure in the above described range, forcing plate 22 toward plate 20 and thereby compacting the powder to form the green part. The compaction forces exerted on the powder are substantially uniform because plates 20 and 22 are each free to move on rods 24, resulting in a green part having a uniform density.

Figure 3:
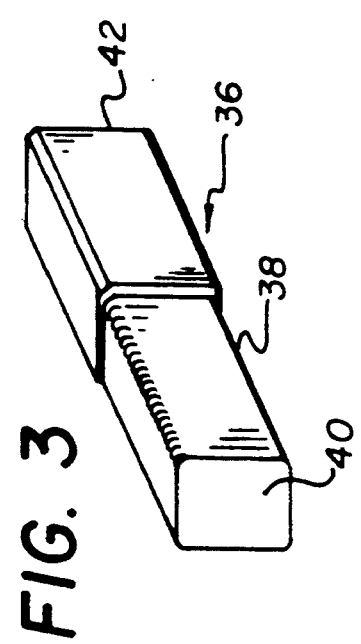
FIG. 3 shows an enlarged schematic view of a ceramic perforator punch according to the invention.

The green part is then sintered to form a net shape ceramic punch 36 according to the invention, illustrated in FIG. 3. Punch 36 comprises ceramic perforator 38 having cutting edge 40 mounted on mounting shank 42. Punch 36 can be mounted by shank 42 on any typical punch assembly, such as a reciprocating punch or a rotary punch upon which can be mounted a plurality of punches 36. Punch 36 can be used for a variety of applications, such as for perforating photographic film, plastics, papers, and fibers.

Mold and die assembly 18 should have dimensionally close tolerances to produce a net shape ceramic capable of being used without post-sintering machining of its working surfaces. For example, compaction surfaces 44 and 46 of respective die sets 26 and 28 can be parallel with a maximum design deviation from parallel, e.g. + or −0.00005 inches. Compaction surfaces 48 and 50 of center platen 30 can be perpendicular to surfaces 44 and 46 and have a maximum design deviation from perpendicular, e.g. + or −0.00005 inches. The dimensionally close tolerances and the shrinkage control described above can produce the net shape ceramic according to the invention.

The fill ratio should be established to produce a green part of a desired dimension, which after sintering will result in a ceramic of the final desired dimension. "Fill ratio" is the ratio of the height of cavity 34 taken along the axis of movement of platform 14 with platform 14 in its initial, lowermost position, to the height of the green part formed in cavity 34 taken along the axis of compaction of the powder in cavity 34. In other words, such height of the green part also equals the distance between compaction surfaces 44 and 46 of mold and die assembly 18 at the final end-of-compacting position. A preferred fill ratio is about 3.0.

The invention will be further illustrated by the following examples of its practice.

EXAMPLE 1

0.3 grams of a ceramic powder was prepared, the powder comprising yttrium oxide ($Y_2O_3$) and zirconium oxide in a ratio of 5:95 mole percent, respectively. The powder had an agglomerate size of between 30 $\mu$m and 60 $\mu$m with an average of about 50 $\mu$m, a grain size of between 0.1 $\mu$m and 0.6 $\mu$m with an average of about 0.3 $\mu$m, and a moisture content of 0.5 percent by volume. Polyvinyl alcohol in the amount of 4 percent by volume of the green part was added to the ceramic powder as a binder and mixed thoroughly by ball milling. The powder was compacted in a die press of the type illustrated in FIGS. 1 and 2, at a compacting pressure of 15,000 psi for 30 seconds and with a fill ratio of about 3.0, to form a green part. The green part was sintered by sequentially heating the green part from room temperature to 300° C. at a rate of 0.3° C./min ; heating the green part from 300° C. to 400° C. at a rate of 0.1° C./min.; heating the green part from 400° C. to 600° C. at a rate of 0.4° C./min.; heating the green part from 600° C. to 1500° C. at a rate of 1.5° C./min.; maintaining the green part at 1500° C. for 120 minutes; cooling the green part from 1500° C. to 800° C. at a rate of 2° C./min.; and cooling the green part from 800° C. to room temperature at a rate of about 1.6° C./min. A net shape ceramic was thus formed having a dimensional shrinkage, from green part to ceramic, of less than 0.001 percent.

Figure 4:
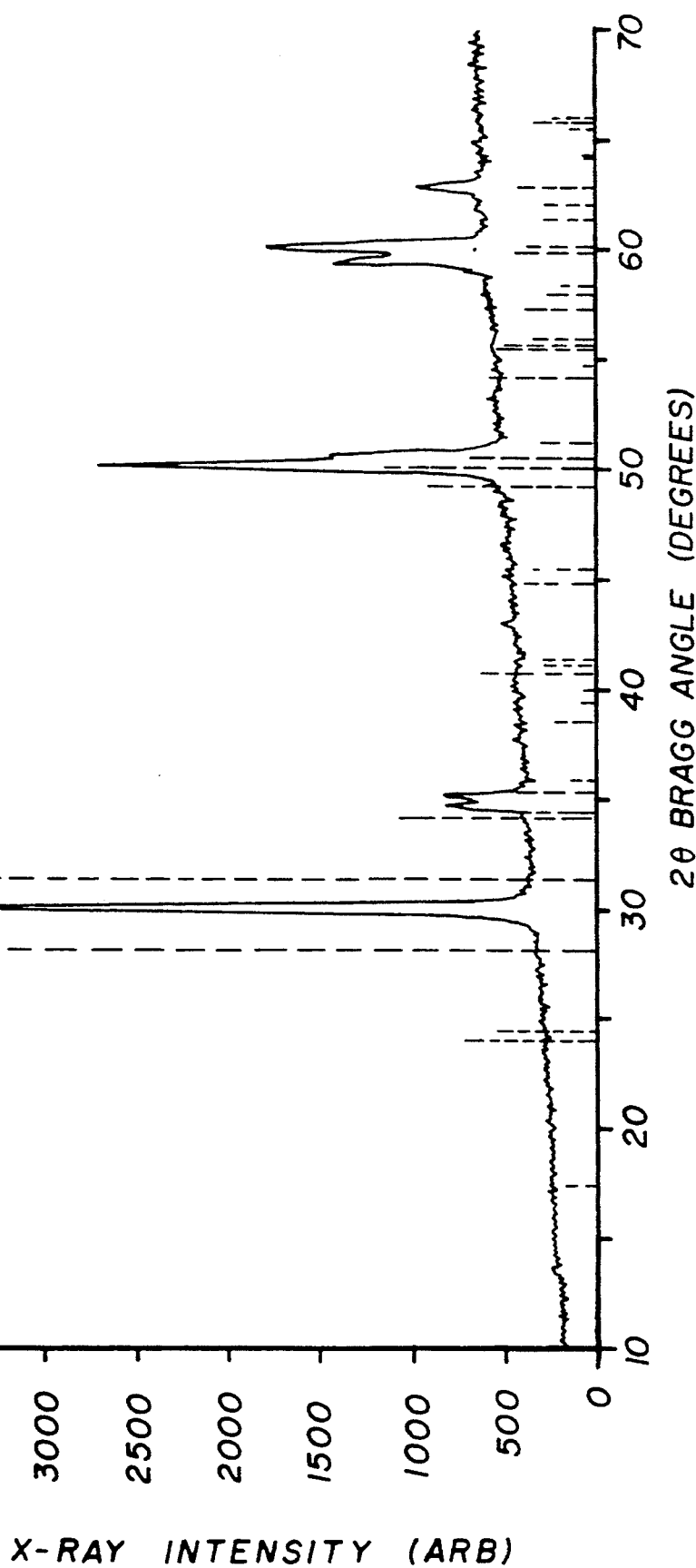
FIG. 4 is an X-ray diffraction curve for a zirconia ceramic of the invention doped with 5 mole percent $Y_2O_3$ showing the peaks corresponding to the tetragonal crystal phase and also the ideal locations for peaks due to monoclinic phase.

An X-Ray diffraction test was performed on the net shape ceramic using an X-ray diffractometer manufactured by Phillips Corp. and the results are shown in FIG. 4. The solid line indicates the actual X-ray diffraction curve obtained, and the dotted lines indicate theoretical monoclinic peak values for purposes of comparison. The presence of a diffraction peak at 29.9 degrees indicates the presence of the tetragonal crystal phase, while the absence of a diffraction peak at 28 degrees indicates the absence of the monoclinic crystal phase. The splitting of the tetragonal peak at 50 degrees indicates the absence of the cubic crystal phase and demonstrates that the peak is due solely to the tetragonal crystal phase.

EXAMPLE 2

Figure 5:
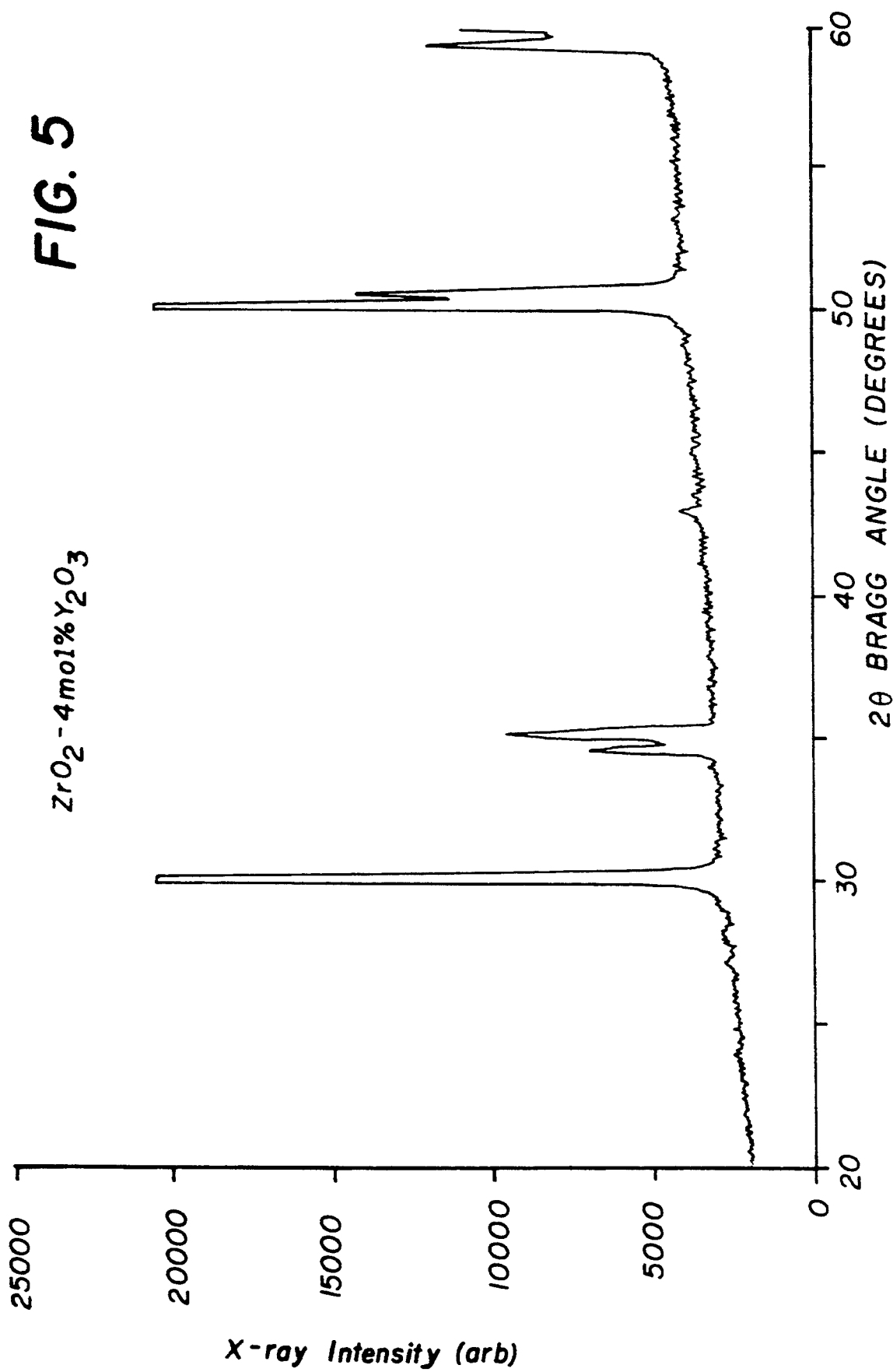
FIG. 5 is an X-ray diffraction curve for a zirconia ceramic of the invention doped with 4 mole percent $Y_2O_3$ showing the peaks corresponding to the tetragonal crystal phase.

Example 1 was repeated but with a ceramic powder comprising yttrium oxide ($Y_2O_3$) and zirconium oxide in a ratio of 4:96 mole percent, respectively. The results are shown in FIG. 5, and as in Example 1 indicate the presence of just the tetragonal crystal phase.

EXAMPLE 3

Figure 6:
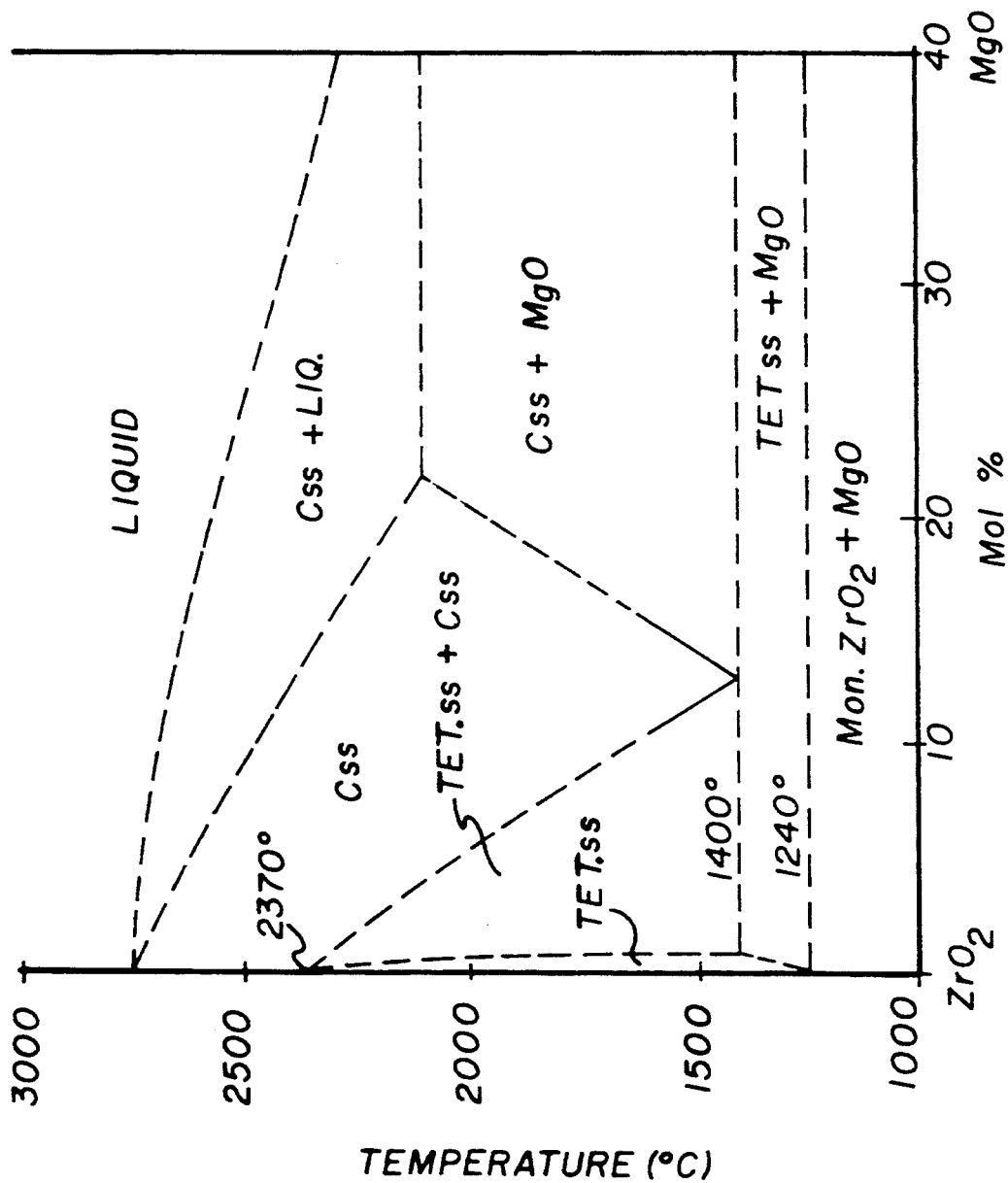
FIG. 6 is a phase diagram of a zirconia ceramic doped with magnesium oxide (MgO).
Figure 7:
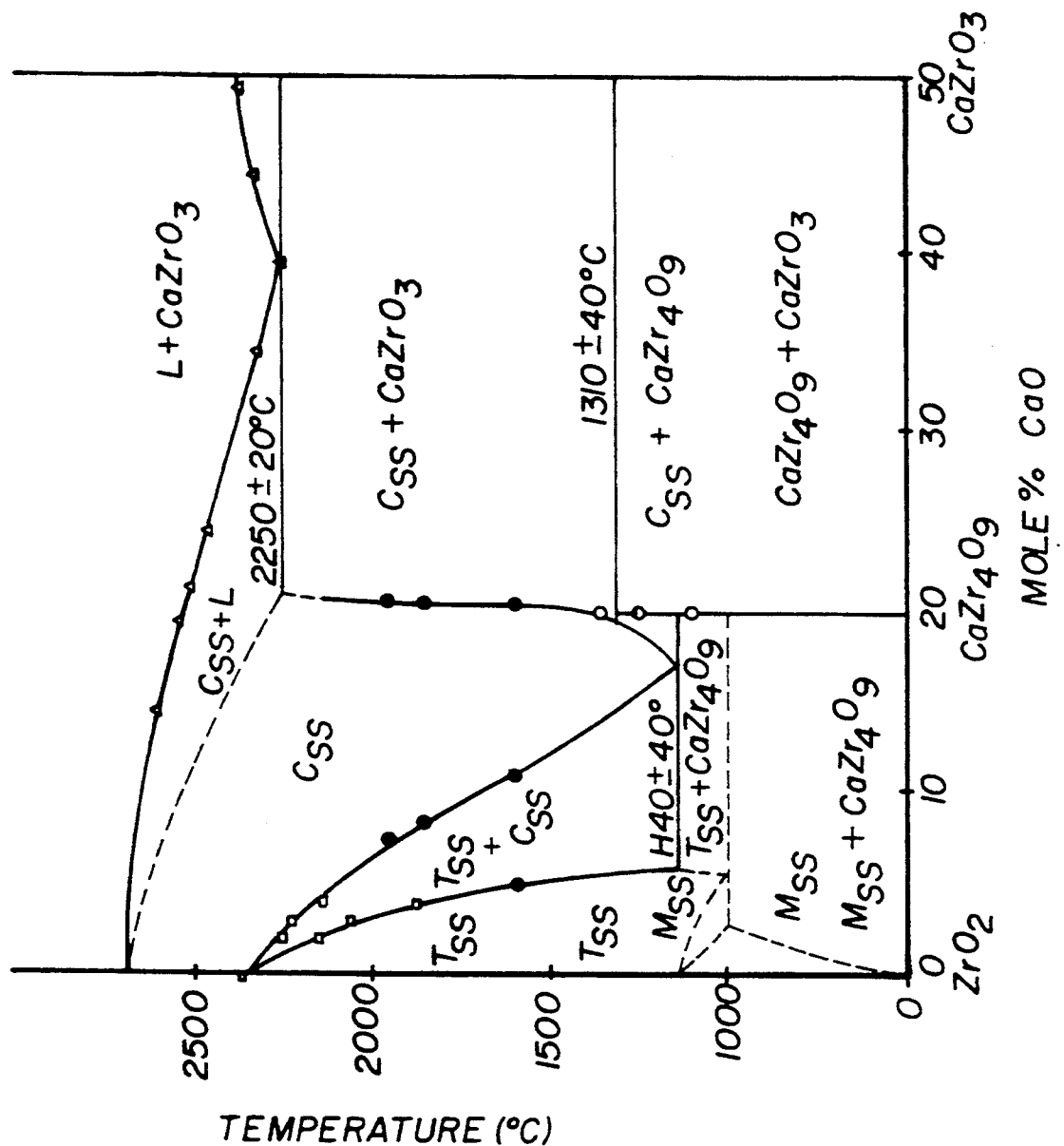
FIG. 7 is a phase diagram of a zirconia ceramic doped with calcium oxide (CaO).
Figure 8:
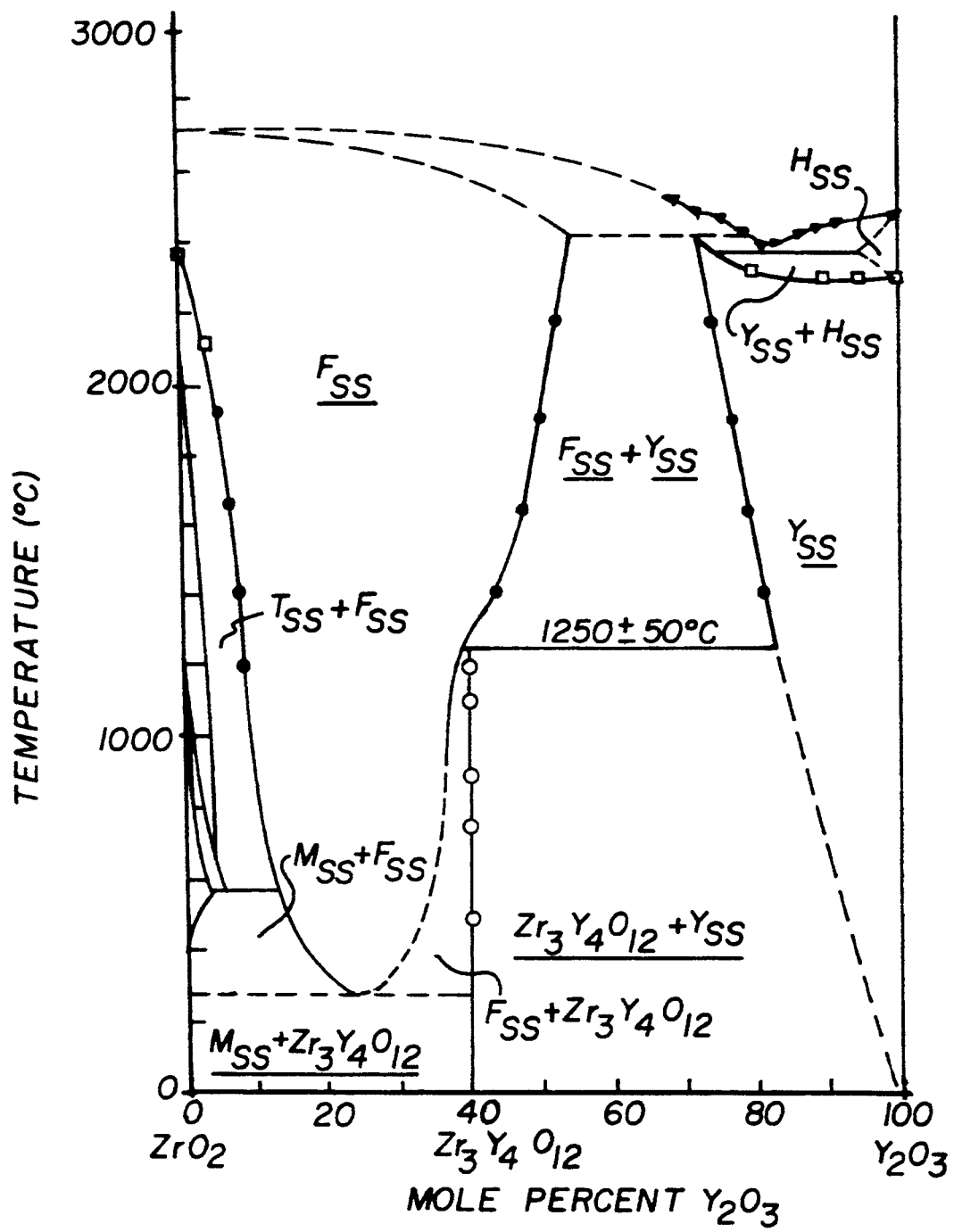
FIG. 8 is a phase diagram of a zirconia ceramic doped with yttrium oxide ($Y_2O_3$).

FIGS. 6–8 are phase diagrams of a zirconium oxide ceramic doped with MgO, CaO, and $Y_2O_3$, respectively. In FIG. 6, Tet. ss is tetragonal solid state, Mon. is monoclinic, and C ss is cubic solid state. In FIG. 7, $T_{ss}$ is tetragonal solid state, $C_{ss}$ is cubic solid state, and $M_{ss}$ is monoclinic solid state. In FIG. 8, $T_{ss}+F_{ss}$ is tetragonal and cubic, and $M_{ss}+F_{ss}$ is monoclinic and cubic. Based on the tests using the $Y_2O_3$ dopant in Examples 1 and 2 and comparing the phase diagram for CaO dopant (FIG. 7) with that for $Y_2O_3$, it is evident that CaO may be used as a dopant in the same proportions as $Y_2O_3$ to produce a zirconium oxide ceramic having just the tetragonal crystal phase. However, comparing the phase diagram (FIG. 6) for MgO with that for $Y_2O_3$ indicates that MgO is useful as a dopant in the respective molar ratio with zirconium oxide of between 0.5:99.5 to 1.0:99.10 in order to produce the net shape ceramic having just the tetragonal crystal phase.

The invention has been described in detail with particular reference to preferred embodiments thereof, but it will be understood that variations and modifications can be affected within the spirit and scope of the invention.

We claim:

1. A net shape zirconia ceramic consisting essentially of zirconium oxide and a single dopant that is selected from oxides of the group consisting of a rare earth element and calcium, and wherein said ceramic has a molar ratio of dopant to zirconium oxide of about 4:96 to less than about 5:95, and wherein said ceramic consists essentially of tetragonal phase crystal grain.

2. The ceramic of claim 1, wherein unessential ingredients are present in an amount not greater than from about 0.1 to 0.01 percent by weight of the ceramic.

3. A ceramic cutting tool comprising a net shape zirconia ceramic consisting essentially of zirconium oxide and a single dopant that is selected from oxides of the group consisting of a rare earth element and calcium, wherein said ceramic has a molar ratio of dopant to zirconium oxide of about 4:96 to less than about 5:95, and wherein said ceramic consists essentially of tetragonal phase crystal grain.

4. The ceramic cutting tool of claim 3, wherein the dopant is $Y_2O_3$.

5. A net shape zirconia ceramic consisting essentially of zirconium oxide and magnesium oxide dopant, wherein said ceramic has a molar ratio of dopant to zirconium oxide of about 0.5:99.5 to less than about 1.0:99.0 and wherein said ceramic consists essentially of tetragonal phase crystal grain.

6. A ceramic cutting tool comprising a net shape zirconia ceramic consisting essentially of zirconium oxide and magnesium oxide dopant, wherein said ceramic has a molar ratio of dopant to zirconium oxide of about 0.5:99.5 to less than about 1.0:99.0 and wherein said ceramic consists essentially of tetragonal phase crystal grain.

* * * * *